(12) United States Patent
Silver et al.

(10) Patent No.: US 10,486,993 B2
(45) Date of Patent: *Nov. 26, 2019

(54) SYSTEM AND METHOD FOR WASTE TREATMENT

(71) Applicant: Cambrian Innovation Inc., Boston, MA (US)

(72) Inventors: Matthew Silver, Cambridge, MA (US); Mark Barosky, Boston, MA (US)

(73) Assignee: Cambrian Innovation, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,801

(22) Filed: Sep. 26, 2017

(65) Prior Publication Data

US 2018/0057382 A1 Mar. 1, 2018

Related U.S. Application Data

(63) Continuation of application No. 14/526,212, filed on Oct. 28, 2014, now Pat. No. 9,771,288.
(Continued)

(51) Int. Cl.
*C02F 3/30* (2006.01)
*C02F 1/00* (2006.01)
(Continued)

(52) U.S. Cl.
CPC ............ *C02F 3/302* (2013.01); *B01D 61/145* (2013.01); *C02F 1/004* (2013.01);
(Continued)

(58) Field of Classification Search
CPC ...... C02F 3/302; C02F 1/004; C02F 2303/24; C02F 1/44; C02F 2101/16; C02F 3/286;
(Continued)

(56) References Cited

U.S. PATENT DOCUMENTS 5,656,059 A    8/1997  Monster et al.
6,117,313 A    9/2000  Goldman et al.
(Continued)

FOREIGN PATENT DOCUMENTS

CN    205398232    7/2016
JP    2006-159112  6/2006
(Continued)

OTHER PUBLICATIONS

Examination Report dated Nov. 1, 2016 for Canadian Patent Application No. 2,783,256 consisting of 4 pages.
(Continued)

*Primary Examiner* — Fred Prince
(74) *Attorney, Agent, or Firm* — Capitol Patent & Trademark Law Firm, PLLC; John Curtin

(57) ABSTRACT

System and methods for treating multi-component waste streams. In general, systems and methods described herein employ a first chamber and a second chamber separated by a barrier and a filtration component that is fluidically connected to the first and second chambers. A waste stream to be treated will flow into the first chamber for treatment of the carbon-containing waste, then into the filtration component for the separation of the stream into a solid waste fraction and a liquid waste fraction.

17 Claims, 3 Drawing Sheets

Related U.S. Application Data

(60) Provisional application No. 61/896,317, filed on Oct. 28, 2013.

(51) Int. Cl.
    *B01D 61/14*     (2006.01)
    *C02F 3/12*     (2006.01)
    *C02F 3/08*     (2006.01)
    *C02F 3/28*     (2006.01)
    *C02F 1/44*     (2006.01)
    *C02F 101/16*     (2006.01)

(52) U.S. Cl.
CPC ............ *B01D 2325/42* (2013.01); *C02F 1/44* (2013.01); *C02F 3/085* (2013.01); *C02F 3/1273* (2013.01); *C02F 3/286* (2013.01); *C02F 2101/16* (2013.01); *C02F 2203/006* (2013.01); *C02F 2301/046* (2013.01); *C02F 2303/24* (2013.01); *Y02W 10/15* (2015.05)

(58) Field of Classification Search
CPC .. C02F 3/085; C02F 2301/046; C02F 3/1273; C02F 2203/006; B01D 61/145; B01D 2325/42; Y02W 10/15
USPC ....... 210/605, 615, 616, 617, 630, 644, 649, 210/150, 151, 252, 259, 638, 660, 661, 210/663, 669, 679, 681, 683
See application file for complete search history.

(56) References Cited

U.S. PATENT DOCUMENTS

| | | |
|---|---|---|
| 6,444,125 B2 | 9/2002 | Han |
| 7,959,780 B2 | 6/2011 | Hawkins et al. |
| 2003/0057162 A1 | 3/2003 | Goulao Crespo et al. |
| 2003/0209489 A1 | 11/2003 | Haerther et al. |
| 2004/0149634 A1 | 8/2004 | Hughes |
| 2004/0159608 A1 | 8/2004 | Hoffland |
| 2004/0198849 A1* | 10/2004 | Aminabhavi .......... B01D 61/52 521/27 |
| 2006/0037896 A1 | 2/2006 | Cote et al. |
| 2006/0207925 A1 | 9/2006 | Levy |
| 2008/0277272 A1 | 11/2008 | Pierce et al. |
| 2009/0250394 A1 | 10/2009 | Taylor |
| 2011/0236724 A1 | 9/2011 | Mayer et al. |
| 2012/0006744 A1 | 1/2012 | Phattaranawik |
| 2012/0024794 A1* | 2/2012 | Fischmann T. ........ B01D 21/30 210/665 |
| 2012/0132521 A1 | 5/2012 | Silver et al. |
| 2012/0152829 A1* | 6/2012 | Henderson ................ C02F 9/00 210/604 |
| 2013/0017414 A1 | 1/2013 | He |
| 2013/0075279 A1 | 3/2013 | Buck et al. |
| 2013/0112601 A1 | 5/2013 | Silver et al. |
| 2013/0264280 A1 | 10/2013 | Zhao et al. |
| 2013/0319940 A1 | 12/2013 | Josse et al. |
| 2015/0210575 A1* | 7/2015 | Silver ...................... C25B 9/08 210/151 |

FOREIGN PATENT DOCUMENTS

| | | |
|---|---|---|
| KR | 20110047615 | 5/2011 |
| WO | WO 2010147683 | 12/2010 |
| WO | WO 2012054629 | 4/2012 |

OTHER PUBLICATIONS

Notice of Reasons for Rejection dated Nov. 1, 2006 for Japanese Patent Application No. 2016-005028 consisting of 4 pages.

Van Rijn, J., "The Potential for Integrated Biological Treatment Systems in Recirculating Fish Culture—A Review", Aquaculture, vol. 139, pp. 181-201 (1996).

Blaedel, et al., "Mechaism of Trace Counterion Transport Through Ion-Exchange Membranes," Anal. Chem., vol. 41 (4), pp. 583-590 (1969).

Kim, et al., "A Microbial Fuel Cell Type Lactate Biosensor Using a Metal-Reducing Bacterium, Shewanella Putrefaciens", J. Microbial Biotechnol., 1999, 9(3), pp. 365-367.

Yang S. et. al., "Comparison between a moving bed membrane bioreactor and a conventional membrane bioreactor on organic carbon and nitrogen removal", Bioresource Technology, Elsevier, BV, GB, vol. 100, No. 8, Apr. 1, 2009, pp. 2369-2374.

\* cited by examiner

SYSTEM AND METHOD FOR WASTE TREATMENT

CROSS REFERENCE TO RELATED APPLICATION

The present application is a continuation of U.S. application Ser. No. 14/526,212, filed Oct. 28, 2014, which claims the benefit of U.S. Provisional Patent Application No. 61/896,317, filed Oct. 28, 2013, the contents of both applications hereby incorporated by reference.

This invention was made with Government support under Contract 1127435 awarded by the National Science Foundation. The U.S. Government has certain rights in this invention.

FIELD OF THE INVENTION

The present application generally relates to treating multi-component waste streams.

BACKGROUND

Aquaculture—the farming of aquatic organisms—is a fast-growing venture that fills a gap between a diminishing supply of wild fish and world demand for seafood. As aquaculture expands globally and environmental regulations become more strict, the reuse of water is necessary both to meet regulation and to sustain production. However, aquaculture wastewater must be treated to be reused. Additionally, aquaculture sites are typically close to areas where discharge to surface waterways or municipal systems is the only option. See, generally, *The State of World Fisheries and Aguaculture*, by the Food and Agricultural Organization of the United Nations (FAO) Fisheries and Aquaculture Department, Rome, Italy, 2012 (209 pages).

Anaerobic digestion is one means by which municipalities treat waste water to reduce organic carbon and solids in volume and mass. Anaerobic digestion has been used to treat agricultural waste with varying rates of success. Anaerobic digestion of agricultural waste, and particularly of aquacultural wastewater, is difficult due to ammonia inhibition and solids concentration. While solids are commonly treated by dilution, this creates a very large volume of waste. Also, the physical removal of ammonia has not always proven satisfactory.

SUMMARY

The present application generally relates to systems and methods for treating multi-component waste streams that involve separating components of waste streams for separate treatment. In accordance with certain aspects, the methods and systems described herein provide for the economical reduction of ammonia concentrations to further the development of a stable, cost-effective anaerobic digester potentially benefiting multiple industries and enabling the combined reduction or removal of total solids (TS), chemical oxygen demand (COD), and nitrogen. Systems and methods described herein may find particular applicability in treating aquacultural wastewater.

In accordance with one aspect, the systems and methods employ a first chamber and a second chamber separated by a barrier, and a filtration component that is fluidically connected to the first and second chambers. A waste stream to be treated will flow into the first chamber for treatment of carbon-containing waste, then into the filtration component for the separation of the stream into a substantially solid waste fraction and a substantially liquid waste fraction. The liquid waste fraction will then flow into the second chamber for further treatment. In particular embodiments, the first chamber is fluidically coupled to an aquacultural wastewater source and the waste stream includes aquacultural wastewater.

In certain aspects, the present application provides a system for treatment of a waste stream. The system includes a first chamber to receive a waste stream comprising at least a first substance and a second substance, a second chamber, and a semipermeable barrier disposed between the first chamber and the second chamber allowing at least the first substance to pass between the first and second chamber while prohibiting the second substance. The system may also include a mechanical filter for separating materials suitable for treatment in the first chamber but not the second chamber from material to be treated in the second chamber. The mechanical filter typically separates solid materials from the waste stream.

In some embodiments, the first chamber is an anaerobic digestion chamber and the second chamber may be an aerobic nitrification reactor. In certain embodiments, the semipermeable barrier is an ion-exchange membrane (e.g., an anion exchange membrane).

Related aspects of the invention provide a system for the combined treatment of a waste stream, wherein two or more substances are treated in substantially different treatment environments. The system includes a first chamber (e.g., for anaerobic digestion) and a second chamber (e.g., for aerobic nitrification) with a semipermeable barrier disposed between the first chamber and the second chamber allowing at least one of the two or more substances to pass between the first and second chamber while prohibiting others. A filtration component capable of separating materials suitable for treatment in the first chamber but not the second chamber from material to be treated in the second chamber may be included.

In some aspects, the filtration component separates solid materials from the waste stream. In some embodiments, the semipermeable barrier is an ion-exchange membrane such as an anion exchange membrane.

Also described herein are methods for treating a waste stream by flowing a stream of waste into a first chamber, flowing at least some of the waste into a filtration component, separating a solid waste fraction from a liquid waste fraction within the waste using the filtration component, and flowing the liquid waste fraction into a second chamber for treatment. In some embodiments, the filtration component comprises a mechanical filter and the separating comprises mechanically filtering the waste. In accordance with one embodiment, the first chamber comprises an anaerobic digestion chamber. In certain embodiments, the second chamber comprises an aerobic nitrification membrane bioreactor, which may include a moving bed membrane bioreactor.

In some embodiments, the moving bed membrane bioreactor includes a suspended media as a structure for the growth of a biofilm and a semi-permeable membrane barrier that allows some compounds to pass and exit the moving bed membrane bioreactor.

DETAILED DESCRIPTION

Figure 1:
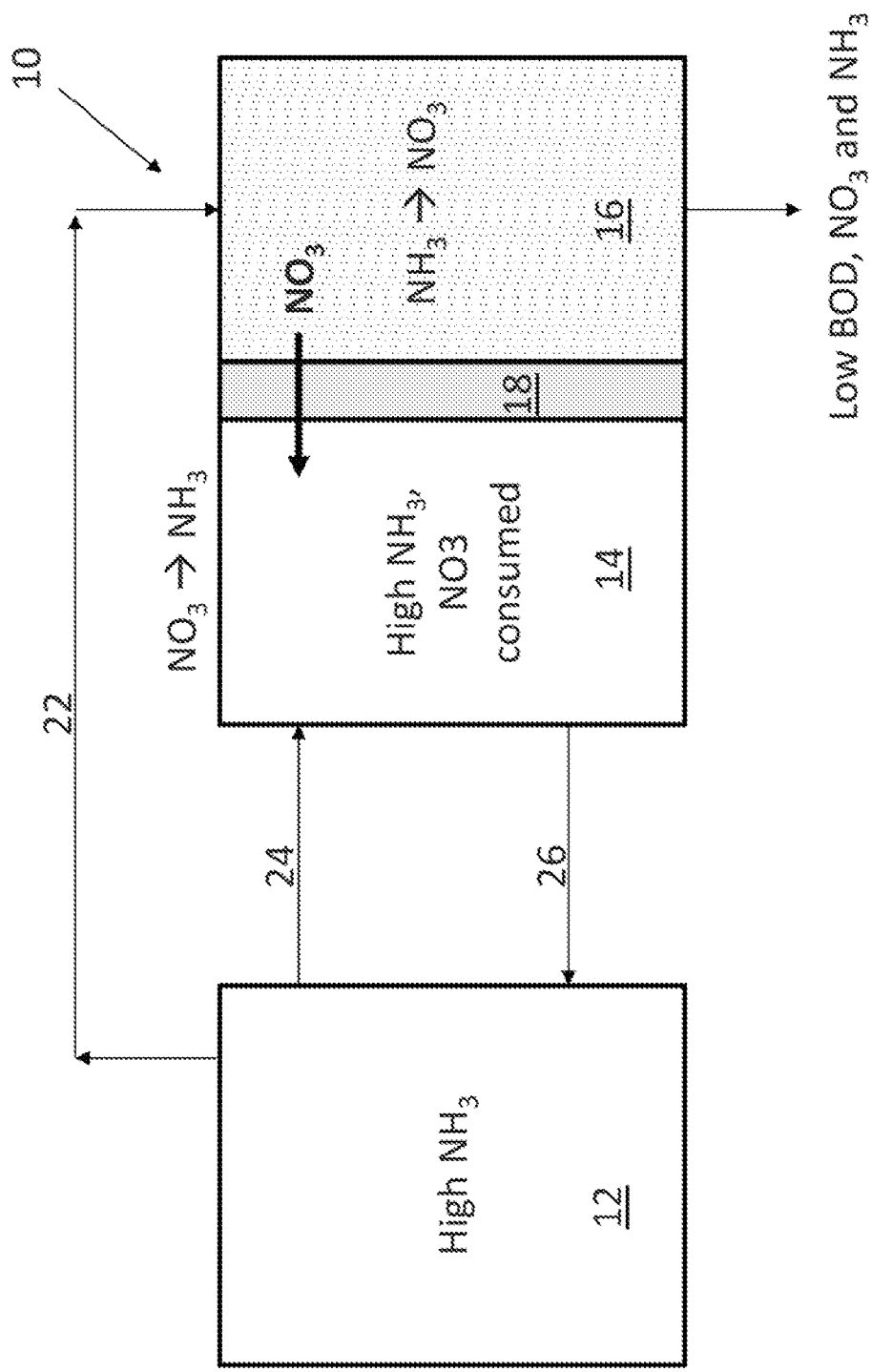
FIG. 1 provides a general process description in accordance with one aspect of the present invention.

The present application relates to systems and methods for treating wastewater. In accordance with certain embodiments, the present application provides methods and systems for the economical reduction of ammonia concentrations to further the development of a more stable, cost-effective anaerobic digester and enabling the combined reduction or removal of total solids (TS), chemical oxygen demand (COD), and nitrogen. Systems and methods described herein may find particular applicability in treating aquacultural wastewater.

Definitions

The term "conduit" or any variation thereof, as used herein, includes any structure through which a fluid may be conveyed. Non-limiting examples of conduit include pipes, tubing, channels, or other enclosed structures.

The term "chamber" or any variation thereof, as used herein, includes any body structure capable of retaining fluid. Non-limiting examples of chambers include vats, kettles, tubs, reactors or other similar structures.

The term "about" or "approximately," as used herein, are defined as being close to as understood by one of ordinary skill in the art, and in one non-limiting embodiment the terms are defined to be within 10%, more particularly within 5%, still more particularly within 1%, and is some cases within 0.5%.

The terms "inhibiting" or "reducing" or any variation of these terms, as used herein, includes any measurable decrease or complete inhibition to achieve a desired result.

The use of the word "a" or "an" when used in conjunction with the term "comprising" herein may mean "one," but it is also consistent with the meaning of "one or more," "at least one," and "one or more than one."

The term "or" as used herein, means "and/or" unless explicitly indicated to refer to alternatives only or the alternatives are mutually exclusive, although the disclosure supports a definition that refers to only alternatives and "and/or."

The term "filtrate" or "permeate" as used herein may refer to material that has passed through a separation device, including, but not limited to a filter or membrane.

The term "retentate" as used herein may refer to material that remains after the diffusate has passed through a separation device.

As used herein, the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "solid phase" as used herein refers to a collection of material that is generally more solid than not, and is not intended to mean that all of the material in the phase is solid. Thus, a phase having a substantial amount of solids, while retaining some liquids, is encompassed within the meaning of that term. Meanwhile, the term "liquid phase," as used herein, refers to a collection of material that is generally more liquid than not, and such collection may include solid materials and gaseous materials.

The term "wastewater" as used herein refers to water to be treated, such as streams or bodies of water from residential, commercial, municipal, industrial or agricultural sources as well as mixtures thereof, which typically contain a variety of contaminants or pollutants.

The term "end-of-pipe (EOP) wastewater" as used herein refers to raw wastewater from an upstream industrial, domestic, or other wastewater producing process.

The term "waste stream" as used herein refers to a flow or source of wastewater.

The term "treated wastewater" refers to wastewater that has been processed in some manner to provide a composition containing less undesirable species or pollutants relative to a starting composition.

The term "substantially" as used herein shall mean mostly.

In one embodiment, the first chamber comprises an anaerobic digestion (AD) chamber and the second chamber comprises an aerobic nitrification membrane bioreactor. The nitrification membrane bioreactor may be a moving bed bioreactor or a suspended growth bioreactor. One example of a particularly useful moving bed is a moving bed membrane bioreactor (MBMBR). An MBMBR, an improvement upon the traditional moving bed bioreactor (MBBR), utilizes a suspended media as a structure to support and facilitate growth of a biofilm and includes a semi-permeable barrier that allows some compounds to pass and exit the MBMBR while retaining those compounds to be treated by the MBMBR. However, it should be noted that any aerobic nitrification reactor can be used in the second chamber, such as a suspended growth nitrification bioreactor.

To improve the stability of AD reactor operation, the reaction-limiting ammonia must first be removed from the digestate and converted to nitrate. The transport of nitrate back into the digestate may be directly facilitated by implementing an aerobic nitrification membrane bioreactor with an ion exchange membrane as a membrane barrier. Containing the nitrification bioreactor in the ion exchange membrane and then placing the reactor directly next the AD digestate, nitrate would be directly transported into the digestate. This design would then facilitate the in situ denitrification rather than requiring completely separate reactor vessels.

FIG. 1 is a schematic overview of the general process 10 in accordance with certain aspects of the present invention and depicts an anaerobic digestion system 12, 14 and an aerobic nitrification reactor 16. A semi-permeable membrane 18 is disposed between AD 14 and aerobic nitrification reactor 16. The wastewater source feeds AD 12, the contents of which are typically characterized by high levels of $NH_3$. Wastewater portions from the AD 12 can be directed to the AD 14 or the aerobic nitrification reactor 16 through conduits 22 and 24, respectively. Digestate from AD 14 can be conveyed back to AD 12 through conduit 26. Typically, wastewater is directed to AD 12, wherein the organic waste is reduced. The typical total solids (TS) concentration in the AD is approximately between 0.5 and 6%. In accordance with certain aspects the TS concentration is approximately between 0.5-2.0%, or in some cases, 2.0-4.0%, and in yet other cases, 4.0-6.0%. The anaerobic digestate is conveyed to aerobic nitrification reactor 16 through conduit 22 where nitrification results in the conversion of total ammoniacal nitrogen (TAN) to $NO_3$—N. The semi-permeable membrane 18 enables transport of negatively charged ions to pass freely from aerobic nitrification reactor 16 to AD 14 to facilitate final nitrogen removal via denitrification. The removal of nitrogen will be carried out by heterotrophic bacteria in the AD in which the bacteria use the solubilized COD as a carbon source and the nitrates as electron acceptors to finally produce nitrogen gas. The system effluent after the nitrification membrane unit will ideally contain reduced amounts of nitrogen, biological oxygen demand, and suspended solids. These amounts are reduced with respect to conventional systems. The actual amounts will vary depending on the composition of the incoming wastewater stream.

Figure 2:
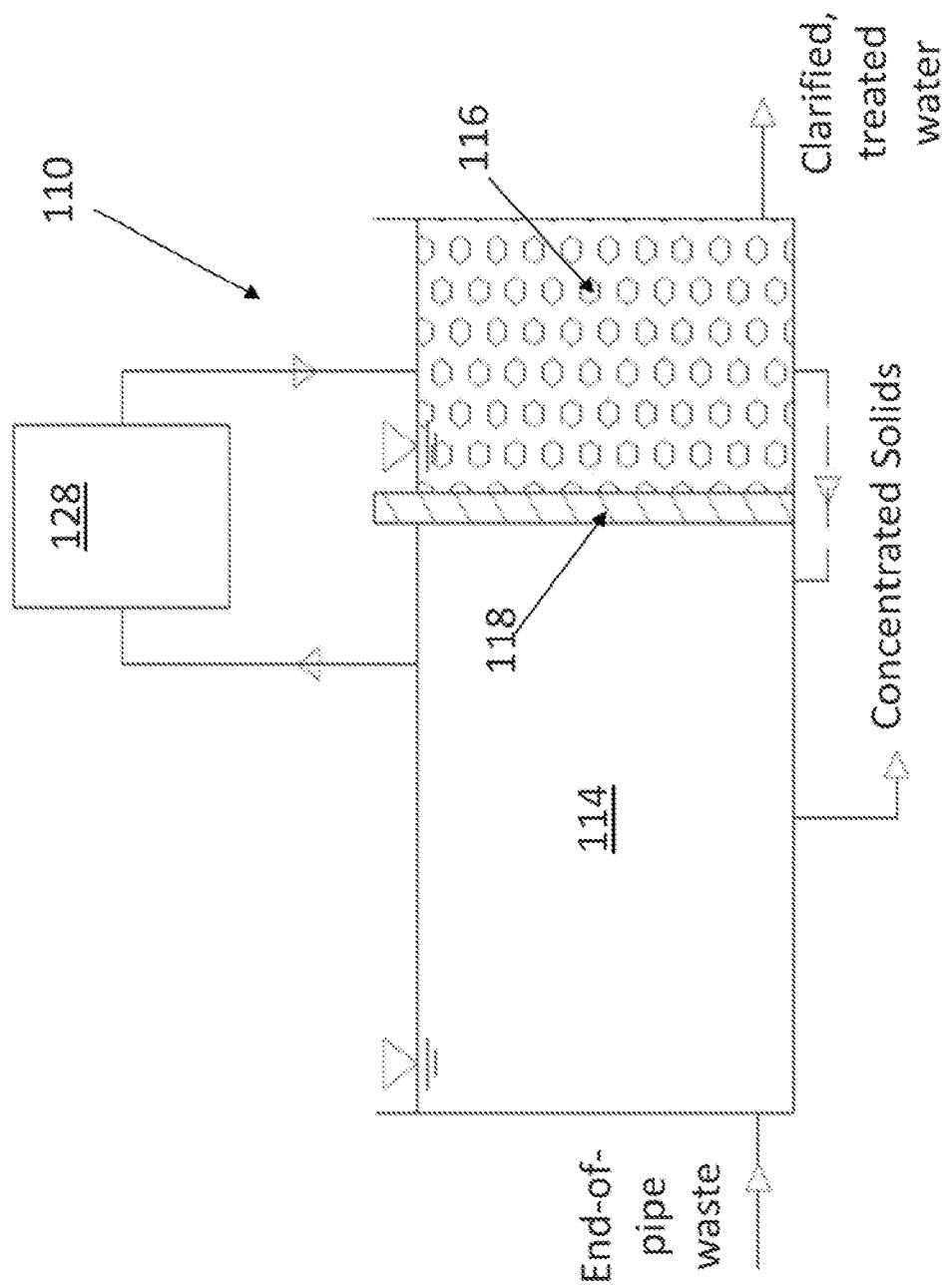
FIG. 2 illustrates one embodiment of the present invention relating to a packaged configuration of the components.

FIG. 2 is a schematic diagram showing a packaged configuration 110 in accordance with certain aspects of the present invention. As shown, the configuration depicts an anaerobic digestion chamber (AD) 114 and an aerobic nitrification reactor 116. A semi-permeable membrane 118 is disposed between AD 114 and aerobic nitrification reactor 116. End-of-pipe (EOP) waste from a wastewater source feeds AD 114, wherein the organic waste solids are reduced. The anaerobic digestate can be conveyed to a mechanical filter 128 to remove excess biomass and then the diffusate can be introduced to aerobic nitrification reactor 116 where nitrification results in the conversion of total ammoniacal nitrogen (TAN) to $NO_3$—N. The semi-permeable membrane 118 enables transport of negatively charged ions to pass freely from aerobic nitrification reactor 116 to AD 114 to facilitate final nitrogen removal via denitrification. The removal of nitrogen can be carried out by heterotrophic bacteria in the AD 114 in which the bacteria use the solubilized COD as a carbon source and the nitrates as electron acceptors to finally produce nitrogen gas. In accordance with certain aspects, the system effluent after the nitrification membrane unit will contain reduced amounts of nitrogen, biological oxygen demand, and solids. Recycling of the stream through the AD process may be enabled in the case of required additional nitrogen removal. The residual solids in the AD 114 can be concentrated via settling and can be removed from the system.

Figure 3:
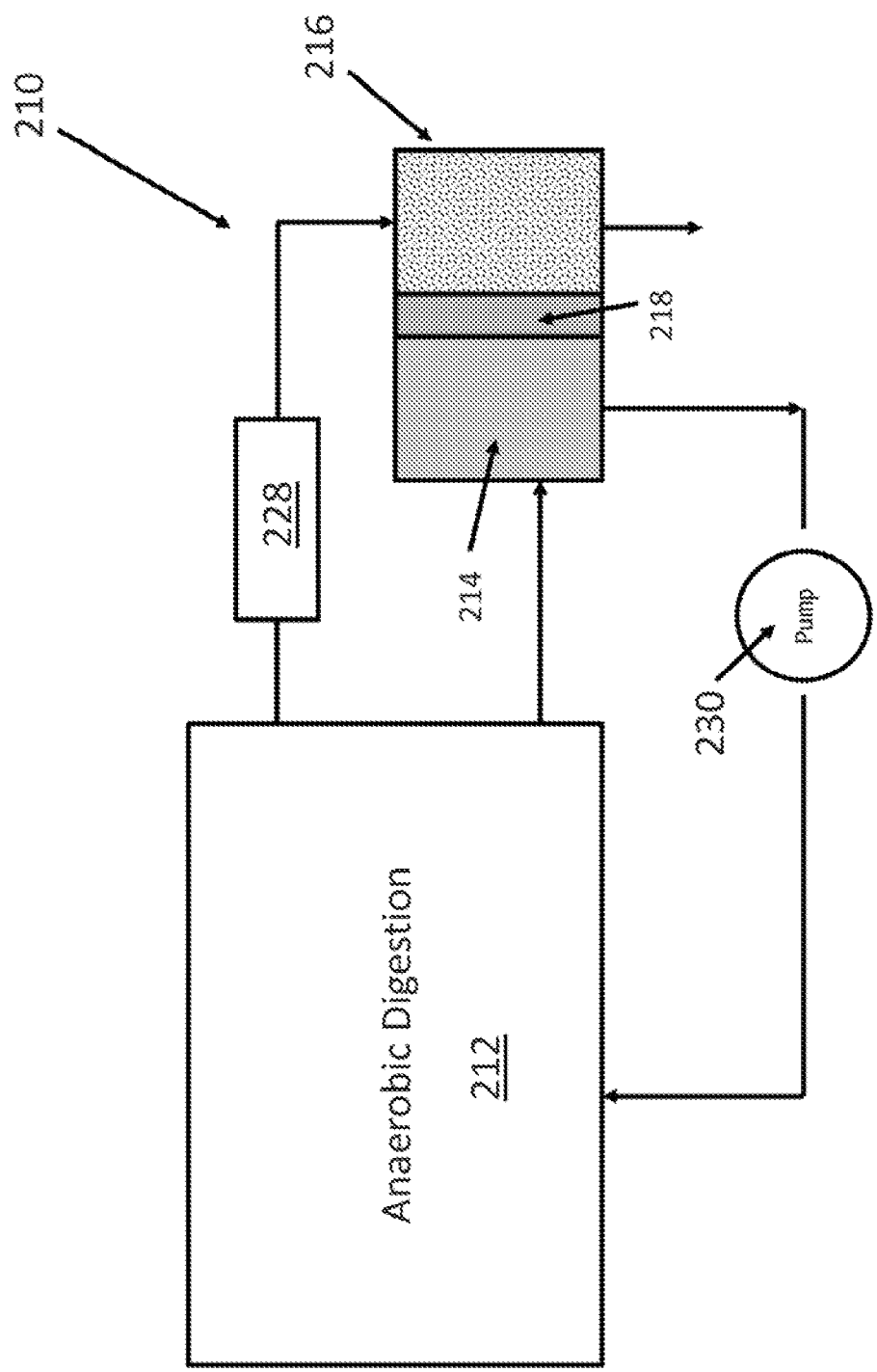
FIG. 3 illustrates another embodiment of the present invention relating to a side-stream configuration of the components.

FIG. 3 is a schematic diagram of a side-stream configuration 210 in accordance with certain aspects of the present invention. The configuration 210 includes an anaerobic digestion system 212, 214 and an aerobic nitrification reactor 216. A semi-permeable membrane 218 is disposed between AD 214 and aerobic nitrification reactor 216. The wastewater source feeds anaerobic chamber 212, where organic waste is reduced. The anaerobic digestate can be conveyed to a mechanical filter 228 to further remove excess biomass and then the diffusate can be introduced to aerobic nitrification reactor 216 where nitrification results in the conversion of total ammoniacal nitrogen (TAN) to $NO_3$—N. The semi-permeable membrane 218 enables transport of ions to pass freely from aerobic nitrification reactor 216 to AD 214 to facilitate final nitrogen removal via denitrification. The removal of nitrogen can be carried out by heterotrophic bacteria in the AD in combination with the solubilized COD to finally produce nitrogen gas. Recycling of the stream by using pump 230 to convey flow from AD 214 to AD 216 may be enabled in the case of required additional nitrogen removal. The system effluent after the nitrification membrane unit will ideally contain reduced amounts of nitrogen, biological oxygen demand, and solids.

In accordance with certain embodiments, the semi-permeable membrane barrier 18, 118, 218 is an ion-exchange membrane and, in some cases, an anion exchange membrane. Understanding the relative abundance of the ionic constituents in the effluent stream will enable an appropriate sizing of the membrane bioreactor unit process. In order for ion transport across the membrane to occur, two conditions must be met: a concentration gradient must exist for both the ion and counter-ion between the two membrane sides, and an electrical charge equivalency must counter the charge movement across the membrane. In other words, if a negatively charged monovalent ion is transported across the membrane from cathode to anode, an equivalent monovalent counter-ion must also move across the membrane in the opposite direction to re-establish electroneutrality between the compartments. In accordance with certain aspects, the underlying goal is to create a favorable nitrate concentration gradient between the membrane unit and the anaerobic digester, in which the nitrate transport is facilitated by a benign counter-ion transfer from the AD to the membrane unit.

In accordance with some embodiments, the aerobic nitrification reactor 16, 116, 216 comprises a moving bed reactor or a suspended growth bioreactor. The moving bed reactor may be a moving bed membrane bioreactor (MBMBR) or a traditional moving bed bioreactor (MBBR). For use in the combined treatment of organic waste (e.g., COD & BOD) and nitrogenous waste, the barrier will allow the passage of nitrates and nitrites, while prohibiting the passage of ammonia. This will allow the nitrates to pass through to the first chamber for microbial denitrification while retaining substances for nitrification in the MBMBR and preventing the aerobic conditions in the second chamber from interfering with the anaerobic character of the first chamber. This allows the system to address significant limitations of anaerobic systems in the treatment of waste with a significant nitrogenous waste components; the generation of ammonia which inhibits further digestion and limits total solids concentrations in the digester. This will, among other benefits, allow for higher concentrations of solids to be treated and allow for smaller treatment systems to provide comparable solids treatment capacity to conventional AD systems. Denitrification is discussed in U.S. Pub. 2013/0112601 to Silver, et al., the contents of which are incorporated by reference for all purposes. See also U.S. Pub. 2012/0132521 to Silver et al., the contents of which are incorporated by reference.

The mechanical filtration component 128, 228 may have a purely mechanical function, such as a Zabel filter or hollow fiber ultrafiltration membrane, or it may be a separate biological treatment unit such as an upflow fixed bed bioreactor (UFBBR), or an upflow anaerobic sludge blanket (UASB) reactor. It should be noted that any component or mechanism which functions to separate solids from first chamber's stream is suitable for use in methods and systems disclosed herein.

The reactor system may be sized relative to the respective concentrations of total suspended solids (TSS), chemical oxygen demand (COD), and nitrogen in the EOP stream and the expected treatment rates to maintain an ammonia concentration <200 mg/L, the generally accepted upper concentration limit. The combined anaerobic digestion and aerobic nitrification reactor system may be sized according to relevant reaction rates obtained from literature or prior in-house studies. Relative compartment sizing will be largely dependent on the reaction rates and the ion flux through the membrane as described by Blaedel et al. (1969) in Equation 1:

$$J_i = \frac{C_{i,1}/C_{a,1}^z - C_{i,2}/C_{a,2}^z}{L/(P_{i,m} \times (Q/a)^z) + \delta_1/(D_{i,w} \times C_{a,1}^z) + \delta_2/(D_{i,w} \times C_{a,2}^z)} \quad (1)$$

where, $C_{i,1}$ and $C_{i,2}$ are the concentrations of the polluting ion i in the MBMBR and the AD compartment, respectively, noted as 1 and 2; $C_{a,1}$ and $C_{a,2}$ are the major bulk counter-ion concentrations in each compartment (e.g., bicarbonate); a represents the valence of the major counter-ion; z represents the ratio between the valence of the target ion (i) (e.g., nitrate) and the valence of the major counter-ion; $\delta_1$, $\delta_2$ are the thickness of the corresponding boundary layers next to the membrane surfaces at the MBMBR and AD sides, respectively; L is the membrane thickness; $P_{i,m}$ is the membrane permeability; Q is the ion exchange capacity of the membrane and $D_{i,w}$ is the diffusion coefficient of the counter-ion in water. Here, Equation 1 shows that the nitrate flux from the MBMBR into the AD is proportional to the difference between the ratio(s) of the target counter-ion to the major counter-ion concentration in the two compartments. This difference is the process driving force.

The waste stream entering the anaerobic digester (AD) contains high amounts of COD, TSS, nitrogen (organic and inorganic), and phosphorous-containing compounds. Because the soluble COD (sCOD) in the EOP is not sufficient alone to enable the complete removal of nitrogen, digestion of the particulate fraction of the EOP is required to extract and solubilize the COD present in particulate form (van Rijn, 1995). However, the presence of $NO_3$—N will preferentially select for heterotrophic denitrification (anaerobic respiration) processes and possibly outcompete the fermentative anaerobobes in substrate utilization, thus potentially reducing VFA extraction processes. As such, the reactor system should be designed based on the balance whereby the VFA production process, the nitrate transport process from the MBMBR into the AD, and the subsequent denitrification process will all be combined and optimized. Solubilizing the COD initially present only in the particulate matter will make the COD available for denitrification; however, the goal is to prevent further reduction to biogas end products such as carbon dioxide and potentially methane and/or hydrogen by balancing the rate of COD solubilization and the nitrate delivery rate into the digestate.

The MBMBR typically use plastic bio-media to support the growth of the nitrifying bacteria. The amount of media and hydraulic retention time will be based on the required ammonia conversion. Similarly, the amount of nitrate production will also contribute to the sizing of the membrane wall separating the two units in order to remove maximal amounts of nitrate as transport of the nitrate into the AD process will be mitigated by the amount of membrane surface area. Suitable media for the biomass carrier may be made from hydrophobic polymers such as polyethylene or polypropylene which are processed to create a highly protected external or internal surface area for biofilm attachment and accumulation of high biomass concentrations. Several commercial organizations supply such media primarily as extruded cylindrical media. Suitable media is commercially available from a number of companies including Evolution Aqua Ltd., Siemens/Aqwise and Hydroxyl. In certain embodiments, the biofilm carrier may occupy about 20% to 75% of the volume of the chamber.

The MBMBR and AD reactors can be placed in the same tank separated only by the ion exchange membrane. The two reactor volumes will be hydraulically equalized to establish equal pressure on both sides of the membrane.

Although certain embodiments are particularly suited to the combined treatment of COD and nitrogenous waste, similar configurations would allow for the treatment of other ionic compounds. Because the semi-permeable barrier can be selected to prohibit the transfer of chemical compounds and biology from chamber to chamber, substantially different treatment environments can be created.

The anaerobic digestion process itself will ultimately reduce chemical oxygen demand (COD) and total solids (TS), but the optimal reduction rate will depend on a multitude of factors including (but not limited to): pH, temperature, alkalinity, solids feed rate, digester solids concentration, hydraulic residence time (HRT), solids retention time (SRT), and internal recirculation rates.

The goal for the nitrification process is required to convert the ammonia produced during the anaerobic digestion processes to nitrate. Subsequently, the nitrate produced in the aerobic nitrification reactor is transported across the membrane to the AD as efficiently as possible. The nitrification performance will be characterized as a function of the volumetric flow rate, the difference between the influent and effluent TAN concentrations, and the media volume in the aerobic nitrification reactor (volumetric TAN removal rate; VTR). Quantification of the nitrate transport rates can be determined as a function of the influent and effluent total nitrogen loading rates (nitrate mass flow in and out of the aerobic nitrification reactor) to verify nitrogen is indeed being removed from the system rather than being converted to a different form.

The architecture of systems 10, 110, 210 can be configured in any way such that there are two chambers separated from each other by the semipermeable membrane. For example, the first chamber and second chamber could be formed by two separate tanks disposed on either side of the barrier as in FIG. 3. Alternatively, the second chamber could be a self-contained unit with at least a portion of its structure composed of the barrier (such as a cylinder with membrane materials for walls), which can be inserted or placed within an existing anaerobic digestion unit.

The present application also relates to methods of utilizing the systems described herein. In accordance with one aspect, the method comprises flowing a stream of waste into a first chamber, flowing at least some of the waste into a filtration component, separating a substantially solid waste fraction from a substantially liquid waste fraction within the waste using the filtration component, and flowing the liquid waste fraction into a second chamber for treatment. In some embodiments, the filtration component comprises a mechanical filter and the separating comprises mechanically filtering the waste. In accordance with one aspect, the first chamber comprises an anaerobic digestion chamber. In certain embodiments, the second chamber comprises an aerobic nitrification membrane bioreactor, which may include a moving bed membrane bioreactor.

In some embodiments, the moving bed membrane bioreactor includes a suspended media as a structure for the growth of a biofilm and a semi-permeable membrane barrier that allows some compounds to pass and exit the moving bed membrane bioreactor.

Water quality is further discussed in U.S. Pub. 2013/0075279 to Buck and Silver, the contents of which are incorporated by reference for all purposes.

It is to be understood that the invention has been described in conjunction with particularly useful specific embodiments thereof and that the foregoing description is intended to illustrate and not limit the scope of the invention. Other aspects, advantages and modifications within the scope of the invention will be apparent to those skilled in the art to which the invention pertains.

What is claimed is:

1. A system for producing clean water, the system comprising:

a first chamber configured to receive one or more waste streams and treat at least a first substance and a second substance;

a second chamber;

an ion-exchange membrane disposed between the first and second chambers and configured to allow the first substance to pass between the chambers and substantially prohibit passage of the second substance; and a mechanical filter fluidly connected between the first and second chambers for retaining materials suitable for treatment in the first chamber but not the second chamber.

2. The system of claim 1, wherein the first chamber comprises an anaerobic chamber.

3. The system of claim 1, wherein the ion exchange membrane comprises an anion exchange membrane.

4. The system of claim 1, wherein one of the waste streams the comprises aquacultural wastewater.

5. The system of claim 1, further comprising a microfiltration membrane or ultrafiltration membrane.

6. The system of claim 1, further comprising a membrane bioreactor.

7. The system as in claim 6 further comprising a suspended media configured to grow a biofilm.

8. The system of claim 6, wherein the system is further configured to allow the first substance to pass through the ionic exchange membrane, from the membrane reactor, to the first chamber.

9. The system as in claim 1 further comprising an aquacultural farming site in combination with the first chamber, ion-exchange membrane and filtration component.

10. A method for producing clean water comprising:

receiving one or more waste streams at a first chamber and treating at least a first substance and a second substance;

allowing the first substance to pass between the first chamber and a second chamber through an ion-exchange membrane and substantially prohibiting passage of the second substance; and retaining materials suitable for treatment in the first chamber but not the second chamber using a mechanical filter fluidly connected between the first and second chambers.

11. The method of claim 10, wherein the first chamber comprises an anaerobic chamber.

12. The method of claim 10, wherein the ion-exchange membrane comprises an anion exchange membrane.

13. The method of claim 10, wherein one of the waste streams comprises aquacultural wastewater.

14. The method of claim 10, further comprising separating the material using a microfiltration membrane or ultrafiltration membrane.

15. The method of claim 10 further comprising growing a biofilm using a suspended media.

16. The method of claim 15 further comprising allowing the first substance to pass through the ionic exchange membrane, from a membrane reactor, to the first chamber.

17. The method of claim 10 further comprising combining aquacultural farming with the reception, allowance and retaining steps.

* * * * *